US012624712B2

(12) United States Patent
Maichl

(10) Patent No.: US 12,624,712 B2
(45) Date of Patent: May 12, 2026

(54) VALVE MODULE SYSTEM

(71) Applicant: FESTO SE & CO. KG, Esslingen (DE)

(72) Inventor: Martin Maichl, Salach (DE)

(73) Assignee: FESTO SE & CO. KG, Esslingen (DE)

( * ) Notice: Subject to any disclaimer, the term of this patent is extended or adjusted under 35 U.S.C. 154(b) by 71 days.

(21) Appl. No.: 18/847,876

(22) PCT Filed: Mar. 6, 2023

(86) PCT No.: PCT/EP2023/055587

§ 371 (c)(1),
(2) Date: Sep. 17, 2024

(87) PCT Pub. No.: WO2023/174725

PCT Pub. Date: Sep. 21, 2023

(65) Prior Publication Data

US 2025/0198431 A1 Jun. 19, 2025

(30) Foreign Application Priority Data

Mar. 17, 2022 (DE) ..................... 10 2022 106 225.2

(51) Int. Cl.
*F15B 13/08* (2006.01)
*F15B 13/044* (2006.01)
*F15B 13/00* (2006.01)

(52) U.S. Cl.
CPC ........ *F15B 13/0817* (2013.01); *F15B 13/044* (2013.01); *F15B 13/0821* (2013.01);
(Continued)

(58) Field of Classification Search
CPC .............. F15B 13/0817; F15B 13/0821; F15B 13/0835; F15B 13/0828; F15B 13/0814;
(Continued)

(56) References Cited

U.S. PATENT DOCUMENTS 4,889,164 A * 12/1989 Hozumi .............. F15B 13/0814 137/884
5,320,497 A 6/1994 Nagai et al.
(Continued)

FOREIGN PATENT DOCUMENTS

CN 102395799 3/2012
DE 42 09 337 1/1993
(Continued)

OTHER PUBLICATIONS

Office Action issued in corresponding Taiwanese Patent Application No. 112109760, Dec. 13, 2024, 10 pages w/translation.
(Continued)

*Primary Examiner* — Kelsey E Cary
(74) *Attorney, Agent, or Firm* — HSML P.C.

(57) ABSTRACT

Valve module system for supplying compressed air to a compressed air consumer, in which valve modules can be provided with differently configured channel plates in order to enter into fluid communication with fluid channels of a carrier plate, with several connecting channels are formed, which are designed to connect a first valve connection and a second valve connection of a valve assembly to a channel opening of a fluid channel.

16 Claims, 4 Drawing Sheets

(52) U.S. Cl.
CPC ........ *F15B 13/0835* (2013.01); *F15B 13/086* (2013.01); *F15B 2013/004* (2013.01)

(58) Field of Classification Search
CPC .............. F15B 13/0825; F15B 13/0882; F15B 13/0878; F15B 13/044; F15B 2013/004; F15B 2013/006; F16K 2200/501
See application file for complete search history.

(56) References Cited

U.S. PATENT DOCUMENTS

| | | | | |
|---|---|---|---|---|
| 2004/0244856 | A1* | 12/2004 | Schauz | F15B 13/0828 137/884 |
| 2007/0131294 | A1 | 6/2007 | Zub | |
| 2007/0278436 | A1* | 12/2007 | Phillips | F15B 13/0857 251/129.03 |
| 2009/0126812 | A1* | 5/2009 | Bogdanowicz | F15B 13/0896 137/637 |
| 2009/0139591 | A1* | 6/2009 | Okamoto | F15B 13/0825 137/884 |
| 2010/0148101 | A1* | 6/2010 | Narita | F15B 13/0839 251/129.01 |
| 2011/0095216 | A1* | 4/2011 | deGreef | G05D 7/0664 251/129.15 |
| 2011/0162739 | A1* | 7/2011 | Mead | F15B 13/0814 137/597 |
| 2012/0037250 | A1 | 2/2012 | Berner et al. | |
| 2014/0182725 | A1 | 7/2014 | Maichl et al. | |
| 2018/0135766 | A1* | 5/2018 | Miyazoe | F16K 27/003 |
| 2019/0264712 | A1* | 8/2019 | Lucidera | F15B 13/0878 |
| 2020/0049271 | A1* | 2/2020 | Miyazoe | F16K 27/00 |

FOREIGN PATENT DOCUMENTS

| | | | |
|---|---|---|---|
| DE | 102 13 397 | 10/2003 | |
| DE | 10 2007 040 929 | 6/2008 | |
| DE | 10 2009 017 877 | 10/2010 | |
| DE | 10 2013 016 652 | 4/2015 | |
| DE | 10 2019 217 068 | 5/2021 | |
| EP | 1 526 288 | 4/2005 | |
| EP | 2 024 648 | 9/2010 | |
| EP | 2 140 183 | 6/2011 | |
| EP | 2 746 598 | 6/2014 | |
| JP | 2004036880 A * | 2/2004 | F15B 13/0807 |
| WO | 2013/013760 | 1/2013 | |
| WO | 2016/124210 | 8/2016 | |

OTHER PUBLICATIONS

Examination Report issued in corresponding German Patent Application No. 10 2022 106 225.2, Nov. 14, 2022, 10 pages.

International Search Report and Written Opinion issued in International Application No. PCT/EP2023/055587 filed Jun. 9, 2023, 22 pages w/partial translation.

* cited by examiner

VALVE MODULE SYSTEM

The invention relates to a valve module system for supplying compressed air to a compressed air consumer. Such a valve module system is sold by the applicant, for example, under the product name valve island CPV and is intended for use in automation technology to supply compressed air in a targeted manner to one or more compressed air consumers, which may be pneumatic cylinders or other pneumatic actuators, or to vent them.

SUMMARY

The object of the invention is to provide a valve module system that can be flexibly adapted to different requirements with regard to the compressed air consumer to be supplied.

This task is solved for a valve module system by the valve module system comprising a carrier plate which is provided with a plurality of interfaces on an interface surface, each interface being designed for the attachment of a valve module and having a connection area which is provided with a plurality of channel openings, each channel opening being connected to a fluid channel formed in the carrier plate.

Furthermore, the valve module system includes one or more valve modules, each of the valve modules having a valve housing in which one or more valve assemblies are received and which rests with a interface surface (a narrow side) at least partially on the respective interface. A channel plate is connected in a sealing manner to the valve housing by means of a first coupling surface and which rests in a sealing manner on the connection area with a second coupling surface, in particular aligned parallel to the interface surface (the narrow side), wherein a plurality of connecting channels being formed in the channel plate, which connecting channels are each designed for a connection between one of the valve assemblies and one of the channel openings. In particular, it is provided that the valve module system comprises one or more valve modules, each of the valve modules having a valve housing which rests with an interface surface (a narrow side) at least partially on the respective interface and in which one or more shafts are formed which are aligned parallel to one another and whose shaft openings are arranged on a valve housing end face in a common shaft opening plane aligned transversely to the interface surface (the narrow side). Furthermore, the valve module system comprises at least one valve assembly which is received in one of the shafts of the valve housing, a first valve connection and a second valve connection being formed on an end face of the valve assembly which is arranged in the region of the shaft opening. A valve seat and an electrically actuatable valve member that can be moved between a closed position for the valve seat and an open position for the valve seat are arranged in a first control channel associated with the first valve connection and/or in a second control channel associated with the second valve connection. In this case, it is envisaged that the valve housing is provided with a channel plate which is connected in a sealing manner to the valve housing end face or the valve assembly by means of a first coupling surface, in particular rests in a sealing manner on the end face of the valve assembly, and which a second coupling surface, in particular one that is aligned parallel to the interface surface (the narrow side) of the valve housing, sealingly engages the connection area, wherein a plurality of connecting channels are formed in the channel plate, which connecting channels are configured to connect the first valve connection and the second valve connection to a respective channel opening.

The function of the carrier plate is first of all to mechanically fix the at least one valve module, in particular a plurality of valve modules, the plurality of valve modules preferably being arranged in a row with opposing side faces adjoining one another. It is preferably provided that the valve housings of the valve modules have two side surfaces aligned parallel to one another, these side surfaces being connected to one another by narrow sides, one of these narrow sides being designed to rest on the interface of the carrier plate and is the interface surface. It is preferably provided that this interface surface is flat and that the corresponding interface on the carrier plate is also flat.

A plurality of fluid channels extend in the carrier plate, which are configured for a supply of fluid or a discharge of fluid to the channel openings provided in the connection area of the interface. It is preferably provided that the valve housing is dimensioned in such a way that it does not cover the connection area with the channel openings realized there, so that when the valve housing is attached to the carrier plate, free access to the channel openings is ensured.

The valve housing can, for example, be designed to be cuboid and has, on an end face that is aligned at a right angle to the interface surface (the narrow side) intended for the support on the carrier plate, several shafts that are spaced apart from one another, in particular at a constant pitch, and aligned parallel to one another. The parallel alignment of the shafts is achieved by each of the shafts being extended in the manner of a recess along an extension axis into the valve housing and the extension axes of the shafts being aligned parallel to one another. Furthermore, it is provided that mouth openings of the shafts, which are also referred to as shaft openings, are arranged in a common shaft opening plane aligned transversely to the interface surface (the narrow side). Preferably, the shafts are designed at least partially with a constant profile along the respective axis of extension, which profile is selected in such a way that a valve assembly can be inserted into each of the shafts.

The valve assembly includes a first valve connection and a second valve connection, each of which delimits a mouth opening of an associated control channel. In this case, it is envisaged that a first control channel is assigned to the first valve connection and that a second control channel is assigned to the second valve connection. Furthermore, it is envisaged that a valve seat and an electrically controllable valve member that can be moved between a closed position for the valve seat and an open position for the valve seat are arranged in at least one control channel, so that a cross-section of the respective control channel can be changed. It is preferably provided that the valve member releases a maximum cross-section of the control channel in the open position and completely closes the control channel in the closed position.

Furthermore, it is provided that the valve module system comprises an interchangeably designed channel plate, the task of which is to establish a fluidically communicating connection between the respective valve assembly and the associated connection area with the channel openings provided therein. For this purpose, the channel plate has a first coupling surface which rests in a sealing manner on a mouth opening of the shaft or in a sealing manner on the end face of the valve assembly received in the respective shaft and, in particular, ensures a sealing coupling between the first valve connection and a connecting channel, in particular a first connecting channel, formed in the channel plate, and between the second valve connection and a further connecting channel, or the first connecting channel, formed in the channel plate. In this case, it is provided that the connecting channels are in fluid communication with a respective channel opening of the connection area on a second coupling surface that is aligned parallel to the interface surface (the narrow side) of the valve housing, and that the second coupling surface rests against the connection area in a sealing manner. It is preferably provided that the channel plate is cuboid and the first coupling surface and the second coupling surface are each flat and are aligned at a right angle to one another.

Depending on the assignment between the first valve connection and one or more of the channel openings and between the second valve connection and one or more other channel openings of the connection area, which is created via the respective connecting channels, different functions can be configured for the respective valve assembly or for a plurality of valve assemblies belonging to the respective valve module. For this purpose, it is in particular envisaged to select a channel plate equipped with a corresponding configuration of the connecting channels from a plurality of differently configured channel plates and to assign this channel plate to the respective valve module and the associated connection area.

Advantageous further developments of the invention are the subject of the sub-claims.

It is advantageous if the channel plate sealingly abuts the valve housing front face penetrated by the shaft openings and delimits with the shafts a pressure chamber in which the at least one valve assembly is received. For example, a plate-shaped rubber-elastic seal is arranged between the channel plate and the valve housing front face, which is penetrated by the shafts and on which the shaft openings are formed, the seal is either designed so that all duct plate-covered shafts form a common pressure chamber or so that each duct plate-covered shaft forms its own pressure chamber or so that groups of shafts form a common pressure chamber. Alternatively, it may be provided that a front surface of the channel plate opposite the valve housing front surface in the assembled state is provided with annular seals made of rubber-elastic material, which are designed for an individual seal of each shaft opening, so that a separate pressure chamber is created for each valve assembly. In a further alternative, it may be provided that each of the shaft openings is surrounded by an annular seal made of rubber-elastic material, against which the end face of the channel plate is pressed in a sealing manner in the assembled state, whereby a separate pressure chamber is also created for each valve assembly. It is preferably envisaged that a common pressure supply or vacuum supply for each of the pressure chambers is carried out via a corresponding connecting channel in the channel plate.

In an alternative embodiment, the valve assembly is designed to seal against an inner surface of the shaft with a peripheral seal and to define a pressure chamber with the shaft, and if a supply connection connected to the pressure chamber is formed on the valve housing or on the end face of the valve assembly which is connected in fluid communication to a connecting channel in the channel plate. The valve assembly is preferably designed in the form of a cartridge or a cartridge that, when viewed in isolation, is not functional in its own right, but is only put into a functional state by being mounted in the shaft of the valve housing. This is due to the fact that the valve assembly does not have a self-contained, pressure-tight housing, but rather relies on the sealing seat in the shaft. To this end, the valve assembly is designed to seal against the inner surface of the shaft with a peripheral seal, thereby defining a pressure chamber with the shaft. The first control channel, which is assigned to the first valve connection, and the second control channel, which is assigned to the second valve connection, extend from this pressure chamber. Furthermore, it is provided that a valve seat and an electrically actuable valve member are arranged in each of the first and second control channels. A supply connection is provided for supplying the pressure chamber with compressed air or a process gas or a process gas mixture or vacuum, via which a fluid supply of the pressure chamber with overpressure or vacuum can be carried out. In the case of a seal between the channel plate and the valve housing, it may be provided that the supply connection is formed on the channel plate and is in fluid communication with an associated channel opening in the connection area via an associated connection channel in the channel plate. If the valve assembly is held in the respective shaft with a sealing gasket all around and only then the pressure chamber is defined, the supply connection can optionally be formed on the valve housing or on the end face of the valve assembly and in this case is connected in a fluidically communicating manner via an associated connecting channel in the channel plate to an associated channel opening in the connection area.

It is preferably provided that the carrier plate has a connecting surface, at which at least some of the fluid channels open, wherein a fluid coupling or a working coupling is assigned to each of the fluid channels opening at the coupling surface. The fluid channels opening out at the connecting surface are each provided with a fluid coupling or a working coupling thus allow fluid lines, in particular flexible fluid hoses, to be connected, which in turn can be connected, for example, in the case of a fluid coupling to a compressed air source or a vacuum source or in the case of a working coupling to a working connection of a compressed air consumer. Thus, the fluid couplings form the fluid interfaces between the valve module system and associated supply devices and pneumatic consumers. It is preferably provided that each fluid channel formed in the carrier plate opens out at the connecting surface and is provided with an associated fluid coupling or working coupling.

In a further embodiment of the invention, it is provided that the connection area has a first mouth opening and an associated first fluid channel is connected to a first working connection arranged on the connecting surface, which may be a first working coupling, and that the connection area has a second mouth opening and an associated second fluid channel is connected to a second working connection arranged on the connecting surface, which may be a second working coupling, and that the connection area has a third mouth opening and an associated third fluid channel is connected to a first fluid connection, which may be a first fluid coupling, in particular a compressed air connection, arranged on the connecting surface, and that the connection area has a fourth mouth opening and an associated fourth fluid channel is connected to a second fluid connection, which may be a second fluid coupling, in particular an exhaust air connection, arranged on the connecting surface.

With this configuration of the mouth openings provided at the connection area and the connections arranged at the connecting surface, a typical mode of operation for a valve module system can be realized. For example, it is provided that a compressed air source is connected to the first fluid connection at the connecting surface, which is connected via the associated third fluid channel to a plurality of third mouth openings in a plurality of connection areas. The same applies to the second fluid connection formed on the connecting surface, which is connected via the fourth fluid channel to a plurality of fourth mouth openings of a plurality of connection areas and can be used, for example, as a venting channel. By contrast, the first fluid channel and the second fluid channel are each provided as a direct connection between the first or second mouth opening associated with a single connection area and a first or second working connection associated with the connecting surface.

In an advantageous further development, it is provided that a seal, preferably of plate-like design, is arranged between the second coupling surface of the channel plate and the connection area, which is designed for individual sealing between the mouth opening openings and the respectively associated connecting channels. For this purpose, the seal, which is preferably made of an elastomeric material or at least has sealing areas that are designed to be elastomeric, has a number of channels passing through it, each of which has the task of ensuring the fluid coupling between a connecting channel and an associated mouth opening, while the sealing section formed around the respective channel ensures the sealing for this fluidically communicating connection.

In a further embodiment of the invention, it is provided that the channel plate for each valve assembly received in the valve housing has an individual fluidic connection of the first valve connection, the second valve connection and the supply connection to a respectively assigned connecting channel. This ensures for each valve assembly that there is a fluidic separation between the first valve connection, the second valve connection and the supply connection both in the channel plate and in the carrier plate. On the other hand, it may be provided that valve assemblies arranged adjacent to one another in a common valve housing also access one or more of the connecting channels formed in the channel plate with their respective first valve connection or second valve connection or supply connection.

It is advantageous if a valve seat and an electrically actuatable valve member that can be moved between a closed position for the valve seat and an open position for the valve seat are arranged in the first control channel, and if a valve seat and an electrically actuatable valve member that can be moved between a closed position for the valve seat and an open position for the valve seat are arranged in the second control channel. In this way, a fluidically communicating connection between the pressure space and the first valve connection and between the pressure space and the second valve connection can be adjusted or completely interrupted depending on the position of the respective valve member. In this case, the first valve member, which is assigned to the first control channel, and the second valve member, which is assigned to the second control channel, can be controlled independently of one another by corresponding electrical signals, in order to allow an individual adjustment of a cross section for both the first control channel and for the second control channel.

In an advantageous further development of the invention, it is provided that the channel plate has a first connecting channel, which is connected to a first valve connection of a first valve assembly and to a first valve connection of a second valve assembly, and has a second connecting channel, which is connected to a second valve connection of the first valve assembly and to a second valve connection of the second valve assembly, and has a third connecting channel which is connected to the supply connection of the first valve assembly, and has a fourth connecting channel which is connected to the supply connection of the second valve assembly. For example, the first connecting channel is connected to a connecting channel which is formed in the carrier plate and opens out at the connecting surface and which is also referred to as the first working channel. Furthermore, it may be provided that the second connecting channel is connected to a fluid channel which is formed in the carrier plate and opens out at the connecting surface and which is referred to as the second working channel. In this case, the first valve assembly, which comprises two 2/2-way valves, and the second valve assembly, which also comprises two 2/2-way valves, in combination form a 4/3-way valve that can be operated in the manner of a full bridge structure. This allows for the first connecting channel and for the second connecting channel to be individually vented or exhausted, provided that the third connecting channel is connected to a compressed air source and the fourth connecting channel is designed as an exhaust air connection.

In an alternative embodiment of the invention, it is provided that the channel plate has a first connecting channel, which is connected to a first valve connection and to a second valve connection of a first valve assembly and to a first valve connection and to a second valve connection of a second valve assembly, and has a second connecting channel, which is connected to the supply channel of the first valve assembly and to a third connecting channel connected to the supply channel of the second valve assembly. In this case, the second connecting channel ensures a supply of compressed air and the third connecting channel ensures an exhaust of exhaust air, so that the compressed air consumer connected to the first connecting channel with its working connection can optionally be pressurized by activation valve assembly and can be vented by activation of the second valve assembly, and in both cases the double flow can be made available, since both valve members of the respective valve assembly are activated. Furthermore, a redundant mode of operation can be realized by this, since both the ventilation and the venting can be carried out via two independently activatable valve members of the respective valve assembly.

In a further alternative embodiment, it is provided that the channel plate has a first connecting channel which is connected to a first valve connection of a first valve assembly and to a first valve connection of a second valve assembly, and has a second connecting channel which is connected to a second valve connection of the first valve assembly and to a second valve connection of the second valve chamber assembly, and has a third connecting channel which is connected to the supply connection of the first valve assembly and to the supply connection of the second valve assembly. In this configuration of the channel plate, a compressed air consumer can be supplied via the first or second connecting channel both from the first valve assembly and from the second valve assembly, wherein both of these compressed air consumers are supplied exclusively with compressed air and no venting is provided. Such compressed air consumers can be designed, for example, as compressed air motors.

In a further embodiment of the invention, it is provided that the channel plate has a first connecting channel, which is connected to a first valve connection and to a second valve connection of a first valve assembly and to a first valve connection and a second valve connection of a second valve assembly, and has a second connecting channel, which is connected to the supply connection of the first valve assembly and to the supply connection of the second valve assembly. In this design of the channel plate, for example, a pressure supply of a compressed air consumer can be carried out, in which both valve assemblies optionally block or release a fluidically communicating connection between the second connecting channel, in particular connected to a compressed air source, and the first connecting channel serving as a working connection. In this case, the first valve assembly and the second valve assembly can be used for flow control.

In a further development of the invention, it is envisaged that the valve member is connected to a piezoelectric drive, in particular to a piezoelectric bender, and that the piezoelectric drive is coupled to a voltage supply, which is electrically connected to a controller that is designed to provide drive signals for controlling the piezoelectric drive. A piezo drive, in particular a piezo bender in the form of a strip, can be used to realize high-precision proportional valve functions. In this case, the valve member designed as a sealing element is to be attached to an end area of the piezo drive, which is held in a fixed position in the valve assembly, for example, by means of a spring-loaded three-point bearing. To cause a deformation of the piezo drive, in particular of the piezo bender, an electrical voltage is required, which must be provided by a voltage supply. This voltage supply is electrically connected to a controller that influences the amount of electrical energy to be supplied by the voltage supply to the piezoelectric drive. It is preferably provided that the high-voltage supply and the controller are designed as components of an electronic circuit, with the controller being designed in particular as a microprocessor. It is particularly preferred that the power supply and the controller are arranged and formed on a common printed circuit.

It is useful if a sensor from the group: pressure sensor, temperature sensor, flow sensor, humidity sensor, is assigned to a fluid channel formed in the carrier plate, which is electrically connected to the controller and which is designed to provide an electrical sensor signal. With the aid of the sensor, for example, a supply pressure of a compressed air source or a working pressure for a compressed air consumer or a temperature or a volume flow or a moisture content of a gas flow flowing in the fluid channel can be determined. The electrical sensor signal provided by the sensor is supplied to the controller via a sensor line and can be processed there. For example, the controller can be designed to carry out a pressure control for a fluid pressure prevailing in the fluid channel. For this purpose, a corresponding control of that valve assembly is carried out, which is fluidically coupled to this fluid channel.

It is preferably provided that the pressure sensor is connected to a sensor channel that branches off from the fluid channel. On the one hand, such a sensor channel, which can also be referred to as a stub line, enables a reliable determination of the pressure prevailing in the fluid channel, but on the other hand, it avoids the undesired inclusion of dynamic pressure components, since there is no significant fluid flow in the sensor channel, whereby a more precise measurement result is to be expected compared to a sensor placed directly in the fluid channel.

In an alternative design of the valve module system, a fluid channel formed in the carrier plate has a throttle section, wherein a first pressure sensor, which is designed to provide a first pressure-dependent electrical sensor signal, is assigned to a first end region of the throttle section, and wherein a second pressure sensor, which is designed to provide a second pressure-dependent electrical sensor signal, is assigned to a second end region of the throttle section, and the first pressure sensor and the second pressure sensor are electrically connected to the controller, which is designed to process the first sensor signal and the second sensor signal. In this embodiment, the throttle section, the first pressure sensor and the second pressure sensor form a device for measuring the flow rate in the fluid channel. In this case, it is not necessary for the throttle section to have a cross section that is reduced in comparison to the rest of the fluid channel. Rather, it is sufficient for the flow resistance for the throttle section to be known in order to be able to determine a pressure difference on the basis of the sensor signals of the sensors that are each arranged at the end of the throttle section, and to be able to calculate the desired flow rate measurement from this. Alternatively, it may also be provided that a single pressure sensor is pneumatically connected both to the first end region of the throttle section and to the second end region of the throttle section and is designed to determine a differential pressure across the throttle section.

BRIEF DESCRIPTION OF THE DRAWINGS

An advantageous embodiment of the invention is shown in the drawings. Here shows.

DETAILED DESCRIPTION

Figure 1:
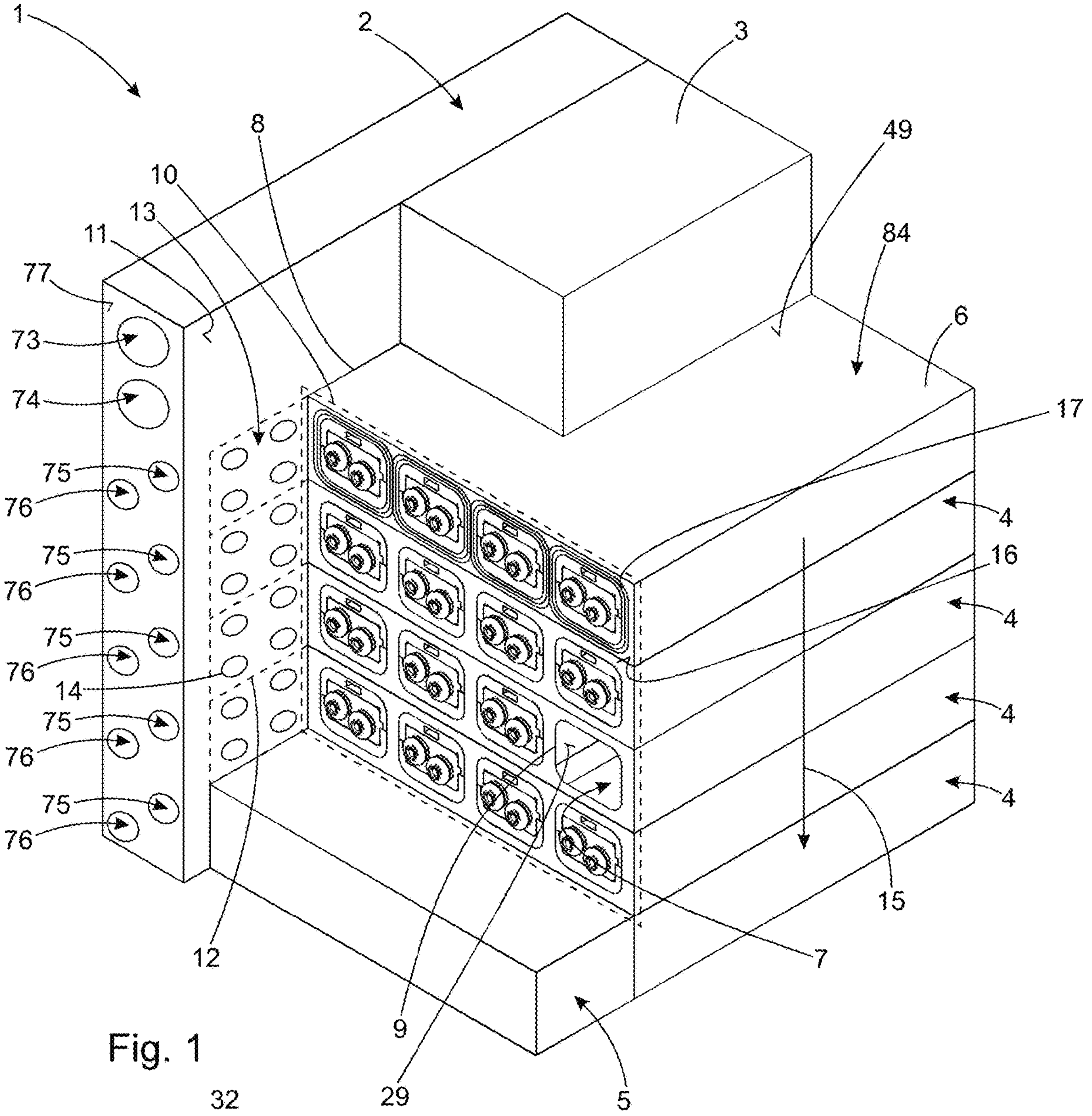
FIG. 1 a schematic and perspective view of a valve module system.

A valve module system 1 shown in FIG. 1 is intended for the fluidic supply of a plurality of compressed air consumers and, for the sake of clarity of its structure, is shown partially disassembled. By way of example, the valve module system 1 comprises a carrier plate 2, to which, in addition to a communication unit 3, a plurality of valve modules 4 arranged along an alignment axis 15 and associated channel plates 5 can be attached. As shown in FIG. 1, only one channel plate 5 is assigned to one of the valve modules 4, while the remaining valve modules 4 are not provided with a channel plate 5 for illustrative reasons. The communication unit 3 enables the valve module system 1 to be connected to a communication system, in particular from the group consisting of OPC UA, a bus communication system and IO Link, which is not shown in the figure and can be used to exchange data, for example, with a higher-level controller, in particular a programmable logic controller, or with a control level or a cloud.

Each of the valve modules 4 comprises a valve housing 6, in which four shafts 7 are formed purely by way of example, which are provided to receive valve assemblies 18 in the form of cartridges or similar. In this case, a profiling of the respective valve assembly 18 is adapted to a profiling of the shaft 7 shown in FIG. 1, which is not equipped with a valve assembly 18, so that the valve assembly 18 can be inserted into the respective shaft 7. In this case, the valve assembly 18 is designed in such a way that it can only be used to control fluid flows when it is installed in the shaft 7. Accordingly, the valve assembly 18 comprises a circumferential seal 28 that is designed to seal against an inner surface 29 of the shaft 7. The valve assembly 18 and the shaft 7 hereby delimit a pressure chamber 30 shown in more detail in FIG. 4.

Figure 2:
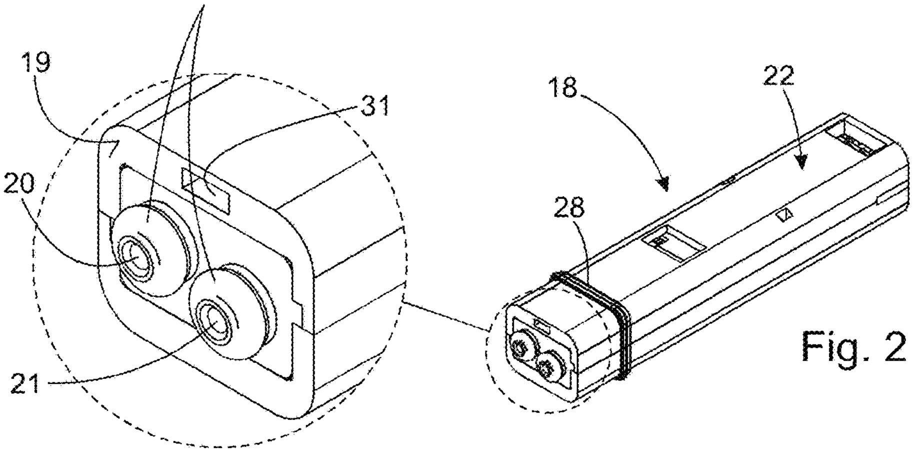
FIG. 2 a schematic and perspective view of a valve assembly.

A first valve connection 20, a second valve connection 21 and a supply connection 31 are formed on an end face 19 of the valve assembly 18, which are shown in more detail in the detailed representation of FIG. 2. It is envisaged, purely by way of example, that the first valve connection 20 and the second valve connection 21 each have an elastomer sealing ring 32, while the supply connection 31 is designed, purely by way of example, as a rectangular cutout in the end face 19 of the valve assembly 18. The valve assemblies 18 are inserted into the shafts 7 of the valve housing 6 in such a way that the end faces 19 of the respective valve assembly 18 are aligned flush with a shaft opening plane 10 of the respective valve housing 6. The shaft opening plane 10 is the plane in which the shaft openings 9 of the shafts 7 are arranged.

The valve housings 6, which are designed purely exemplarily in the shape of a cuboid, rest with a interface surface (a narrow side) 8 aligned at a right angle to the shaft opening plane 10 flat on the purely exemplarily flat interface surface 11. The valve housings 6 are fixed to the carrier plate 2 by means of fasteners, with a defined position being provided on the carrier plate 2 for each valve housing 6, which is also referred to as interface 12. This interface 12 also includes a connection area 13, which is of a purely exemplary rectangular configuration, is not covered by the valve housing 6 and at which a plurality of channel openings 14 open out. Each of the channel openings 14 is connected to a fluid channel 33 to 36 formed in the carrier plate 2, as shown in more detail in FIG. 4. A channel plate 5 is provided for each valve module 4 to ensure a fluid connection between the valve assemblies 18 and the channel openings 14 in the connection area 13, although only a single channel plate 5 is shown in FIG. 1 for reasons of clarity.

The channel plate 5 is secured in a manner not shown in more detail to the respective valve housing 6 and to the interface 12 of the carrier plate 2 and ensures a fluid-tight connection between the first valve connection 20, the second valve connection 21, the supply connection 31 of the respective valve assembly 18 and the respectively associated channel opening 14.

In an alternative variant of a valve module 84, as provided at the top of the row of valve modules 4, 84 in FIG. 1, an individual seal for each shaft 7 is ensured by a seal 17 arranged in a recess of a valve housing end face 16, running around the respective shaft opening 9, when the channel plate 5 is in contact. Since in this case the pressure chamber is bounded by the channel plate 5, the seal 17 and the shaft 7, the seal 28 provided on the valve assembly 18 and the supply connection 31 can be dispensed with, since the valve assembly 18 can be supplied through the supply duct 40 in the channel plate, which opens into this pressure chamber, as shown in FIG. 3.

Figure 4:
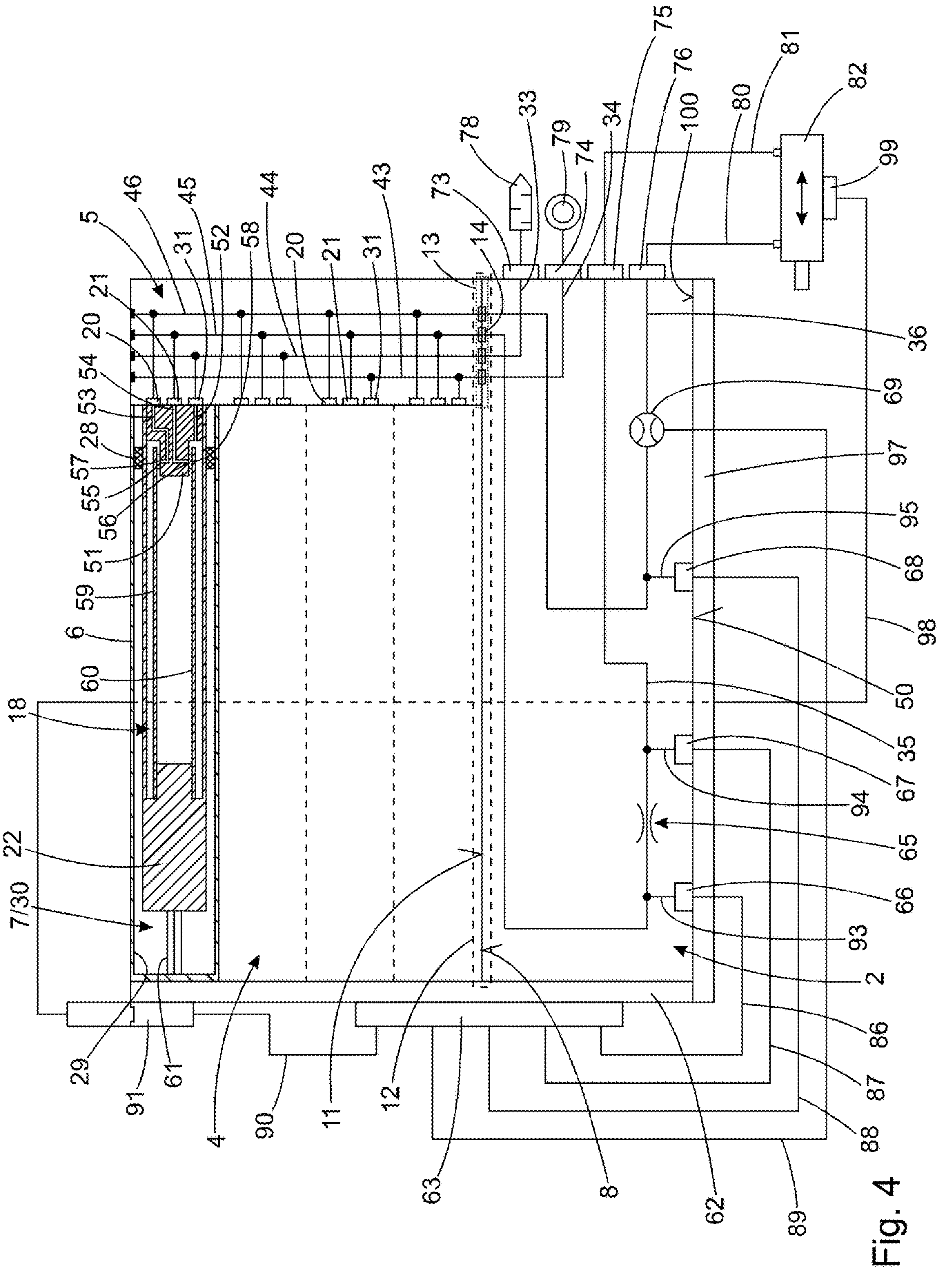
FIG. 4 a schematic representation of the fluidic and electrical interconnection in the valve module system according to FIG. 1, FIG. 5 a first embodiment of a channel plate that is provided for coupling to two adjacently arranged valve assemblies, FIG. 6 a second embodiment of such a channel plate, FIG. 7 a third embodiment of such a channel plate, FIG. 8 a fourth embodiment of such a channel plate, FIG. 9 a second mounting variant for the sensors in the carrier plate, and FIG. 10 a third variant for the placement of the sensors in the carrier plate.

The fluid channels 33 to 36 formed in the carrier plate 2 end at an end face of the carrier plate 2, which is also referred to as the connecting surface, as is also shown schematically in FIG. 4. Each of the fluid channels 33 to 36 opens out at a connecting surface 77 of the carrier plate 2 and in so doing forms a fluid interface 73, 74, 75, 76, which is provided with a fluid coupling, which for example allows a fluid hose to be connected.

Figure 3:
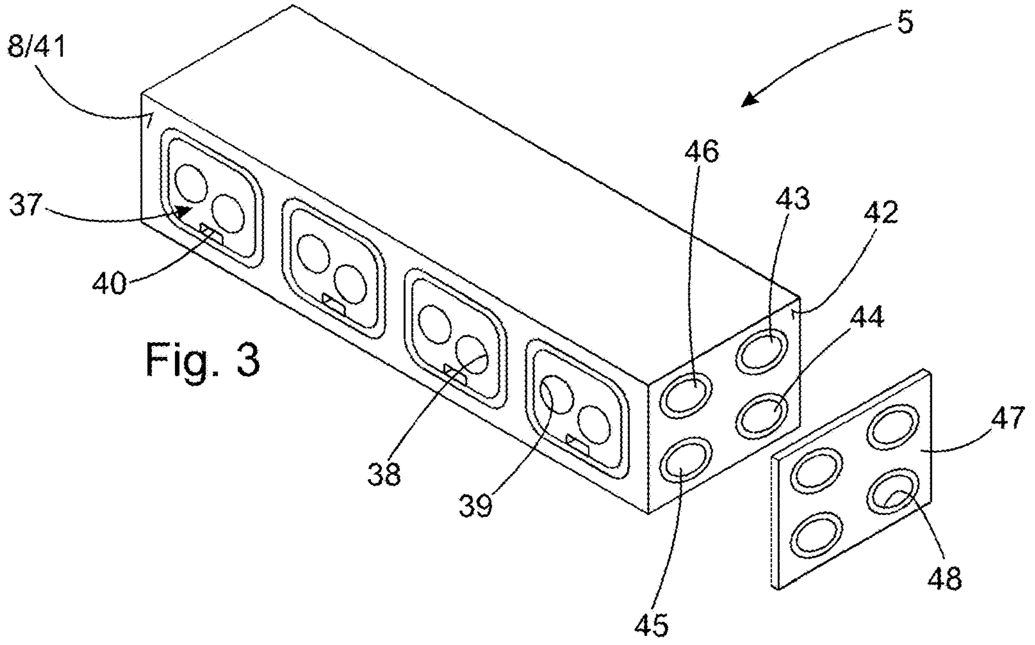
FIG. 3 a schematic and perspective view of a channel plate.

FIG. 3 shows a schematic perspective view of a channel plate 5. The channel plate 5 comprises a total of four valve interfaces 37, which are arranged at the same pitch as the shafts 7 in the valve housing 6. Each of the valve interfaces 37 is intended for fluid-tight coupling to an associated valve assembly 18. For example, each of the valve interfaces 37 comprises a first receiving bore 38, a second receiving bore 39 and a supply shaft 40. The first receiving bore 38 serves to receive the sealing ring 32 of the first valve connection 20, while the second receiving bore 39 serves to receive the sealing ring 32 of the second valve connection 21. The supply shaft 40 can be used when the channel plate 5 is used in conjunction with the valve module 4 for a fluid-tight coupling with the supply connection 31 on the front face 19 of the valve assembly 18. When the channel plate 5 is used in conjunction with the valve module 84, the supply shaft can be used for a fluid supply into the pressure chamber, which is bounded by the channel plate 5, the seal 17 and the shaft 7.

The surface of the channel plate 5, which is preferably flat and provided with the valve interfaces 37, is also referred to as the first coupling surface 41. A second coupling surface 42, which is oriented at a right angle to the first coupling surface 41 purely by way of example and has a plane surface, serves to rest on the connection area 13 of the interface 12. A first connecting channel 43, a second connecting channel 44, a third connecting channel 45 and a fourth connecting channel 46 open out at the second coupling surface 42. Each of these connecting channels 43 to 46 can be in fluid communication with one of the two receiving bores 38, 39 or with the supply shaft 40 in a manner described in more detail below.

As a purely exemplary arrangement, a sealing plate 47 is provided between the second coupling surface 42 and the connection area 13, which, as a purely exemplary arrangement, is made of an elastomeric material. This sealing plate 47 is penetrated by holes 48 corresponding to the arrangement of the connecting channels 43 to 46 in the channel plate 5, which thus ensure a fluidically communicating connection between the channel openings 14 and the connecting channels 43 to 46 in the channel plate 5.

As can be seen from the schematic representation in FIG. 4, the valve assembly 18, together with the shaft 7, delimits a pressure chamber 30 that is in fluid communication with the supply connection 31. A nozzle carrier 51 belonging to the valve assembly 18, whose outer end face forms the end face 19 of the valve assembly 18, has a supply channel 52, a first control channel 53 and a second control channel 54 formed in it. In this case, the supply channel 52 connects the supply connection 31 to the pressure chamber 30. The first control channel 53 connects the first valve connection 20 to a first valve seat 55. The second control channel 54 connects the second valve connection 21 to a second valve seat 56. A first valve member 57, which is formed, for example, as an elastomeric sealing element, rests in a sealing manner on the first valve seat 55, as shown in FIG. 4. In this case, the first valve member 57 is attached to a first piezoelectric element 59, which is designed as a piezoelectric bender and is fixed to a cartridge housing 22 of the valve assembly 18 at an end region facing away from the first valve member 57. In the same way, as shown in FIG. 4, the second valve member 58, which is also designed as a rubber-elastic sealing element, rests in a sealing manner on the second valve seat 56 of the nozzle carrier 51 and is coupled to a second piezoelectric element 60, which is fixed at the end to the cartridge housing 22.

When the first piezoelectric element 59 is energized with an electrical voltage, a curvature of the first piezoelectric element 59 is caused, by which the first valve member 57 is lifted off from the first valve seat 55, so that a fluidically communicating connection between the pressure space 30 and the first valve connection 20 is released. The same applies in the same way to the second piezoelectric element 60, which can assume a curved position as a result of an electrical voltage, in which the second valve member 58 is lifted off from the second valve seat 56 in order to release a fluidically communicating connection between the pressure space 30 and the second valve connection 21. To provide these electrical voltages for the first piezoelectric element 59 and the second piezoelectric element 60, only schematically represented electrical connecting lines 61 are provided, which are electrically connected to a control board 62. A controller 63 is arranged on the control board 62, which comprises a microprocessor and a voltage generator in a manner not shown in more detail, and which is designed to control the voltage supply as a function of a control program running in the microprocessor and in dependence on sensor signals, which are described in more detail below, for controlling the voltage supply, in order to bring about the desired curvature of the first piezoelectric element 59 and/or of the second piezoelectric element 60.

In an alternative embodiment for the piezoelectric elements, which is not shown, it is envisaged that these assume a curved position in a neutral position without the application of voltage, so that the respectively associated valve members or sealing elements are lifted from the respective valve seats and, when an electrical voltage is applied, undergo a deformation by means of which the respectively associated valve member or sealing elements are pressed onto the respective valve seat in a sealing manner.

As can be further seen from the representation in FIG. 4, it is envisaged, purely by way of example, that the channel plate 5 is penetrated by a total of four connecting channels 43 to 46, which can be connected in different configurations to the respective first and second valve connections 20, 21 of the associated valve assembly 18 and to the respective supply connections 31 of the respective valve assembly 18. It can also be seen from the representation in FIG. 4 that the four channel openings 14 are each connected in a fluidically communicating manner, via associated fluid channels 33 to 36, to the fluid couplings designated as fluid interfaces 73 to 76 and not shown in more detail. Furthermore, it is envisaged that the fluid interfaces 73 to 76 are arranged on the connecting surface 77 of the carrier plate 2. As can be seen from FIG. 1, the two fluid interfaces 73 and 74 are arranged away from the fluid interfaces 75 and 76, which in turn are assigned to each valve module. To clarify the relationships between the fluid interfaces 74 to 76, these are shown in FIG. 4 in a common plane of representation.

For example, a muffler 78 is arranged at the first fluid interface 73, so that the associated first fluid channel 33 can also be designated as an exhaust air channel. A compressed air source 79 is attached to the second fluid interface 74, so that the second fluid channel 34 can also be designated as a supply channel. A first working line 80 of a compressed air consumer 82 is attached to the third fluid interface 75, so that the associated third fluid channel 35 can also be referred to as the first working channel. A second working line 81 of the compressed air consumer 82 is attached to the third fluid interface 76, so that the associated fourth fluid channel 36 can also be referred to as the second working channel. As an example, the compressed air consumer 82 is designed as a double-acting pneumatic cylinder and is intended to provide a bidirectional linear movement.

As shown in FIG. 4, the fluid channels 33 to 36 in the carrier plate 2 and the connecting channels 43 to 46 in the channel plate 5 are coordinated with one another in such a way that, for example, the compressed air provided by the compressed air source 79 is provided through the second fluid channel 34 to the first connecting channel 43. The channel plate 5 is designed in such a way that the compressed air from the compressed air source 79 is supplied to the supply connections 31 of the two lower valve assemblies 18 arranged in the valve housing 6. As an example, it is envisaged that the first valve connection 20 of all valve assemblies 18 is connected to the third connecting channel 45, which in turn is connected to the third fluid channel of the carrier plate 2 and opens out at the third fluid interface 75, to which, according to the representation of FIG. 4, the second working line 81 of the compressed air consumer 82 is connected. Furthermore, it is envisaged that the first fluid channel 33 intended for venting is connected to the second connecting channel 44 and that the latter is connected to the supply connections 31 of the two upper valve assemblies 18 arranged in the valve housing 6. By way of example only, it is envisaged that the second valve connection 21 of each valve assembly 18 is connected to the fourth connecting channel 46, which in turn is connected to the fourth fluid channel 36, with the fourth fluid channel 36 opening out at the fourth fluid interface 76. For example, it is envisaged that the first operating line 80 of the compressed air consumer 82 is connected to the fourth fluid interface 76. As a result of the fluidic interconnection defined by the channel plate 5, the two lower valve assemblies 18 accommodated in the valve body 6 serve for the freely selectable pressurization of the first working line 80 or the second working line 81. The two upper valve assemblies 18 accommodated in the valve body 6 serve for the freely selectable venting of the first working line 80 or the second working line 81.

Thus, the fluidic interconnection of the four valve assemblies is designed in such a way that both the ventilation function and the venting function for each of the two working lines 80, 81 can be redundantly effected by two of the valve assemblies 18, so that the respective ventilation or venting function is maintained even if one of the valve assemblies 18 fails, although a reduced flow rate must be accepted in this case.

In order to enable a metrological recording of the flow processes for the compressed air consumer 82, a throttle 65 is arranged in the third fluid channel 35, which has a defined flow resistance. A first pressure sensor 66 and a second pressure sensor 67 are arranged at each end of the throttle 65 and are electrically connected to the controller 63 via associated sensor lines 86, 87. Each of the two pressure sensors 66, 67 provides an electrical sensor signal to the controller 63 via the associated sensor lines 86, 87, from which the controller 63 can determine a pressure difference between the first pressure sensor 66 and the second pressure sensor 67 and can determine a flow rate through the third fluid channel 35 on the basis of the known flow resistance of the throttle 65.

A third pressure sensor 68 and a flow meter 69 are arranged in the fourth fluid channel, which are connected to the controller 63 via sensor lines 88, 89 and which are also designed to provide sensor signals to the controller 63. For example, the use of the combination of the third pressure sensor 68 with the flow meter 69 enables a direct flow measurement in the fourth fluid channel 36.

As shown in FIG. 4, the pressure sensors 66 to 68 are each arranged at the end of a stub line 93 to 96 on a mounting surface 100 of a sensor board 97, in which the sensor lines 86 to 89, which are only drawn separately for reasons of representation, are integrated in practice. Depending on the application, it may be provided that the respective stub line 93 to 96 is closed in a fluid-tight manner by means of an associated pressure sensor 66 to 68, as shown in FIG. 4, or alternatively a blind insert a blind plug into the respective stub line 93 to 96, provided that no pressure measurement or other measurement is required for the third fluid channel 35 or the fourth fluid channel 36. As can be seen from FIG. 4, the component surface 100 of the sensor board 97 is arranged opposite a bottom side 50 of the carrier plate 2.

In addition, the controller 63 is assigned a sensor line 90, which is provided with a plug connector 91 at the end. As shown in FIG. 4, a sensor cable 98 is plugged into the plug connector 91, which is used for an electrical connection between a position sensor 99 assigned to the compressed air consumer 82 and the controller 63.

In the different variants of channel plates 24 to 27, as shown in FIGS. 5 to 8, the connecting channels 43 to 46 formed in the respective channel plates 24 to 27 are provided with the designations P for pressure supply, S for venting, A for the first working connection and B for the second working connection, which were previously used in pneumatics. The assignment of the respective function to the respective connecting channel 43 to 46 is thus identical to the schematic representation according to FIG. 4, but can also be selected in a different way, for example if a reverse arrangement of the silencer 78 and compressed air source 79 is made at the first fluid interface 73 and the second fluid interface 74.

Alternatively, it could also be provided to attach different compressed air sources or other sources of pressurized gases to both the first fluid interface 73 and the second fluid interface 74. This allows the valve module system to be used, for example, to dispense gas mixtures with variably adjustable proportions of compressed air and a pressurized gas.

The channel plates 24 to 27 are intended purely as examples for coupling two valve assemblies 18. Depending on the application, a redundant coupling of four valve assemblies 18 can also be provided in the same way as in FIG. 4, in which case the connection configuration shown in each case is duplicated, in particular mirrored, in the respective channel plate 24 to 27.

Figure 5:
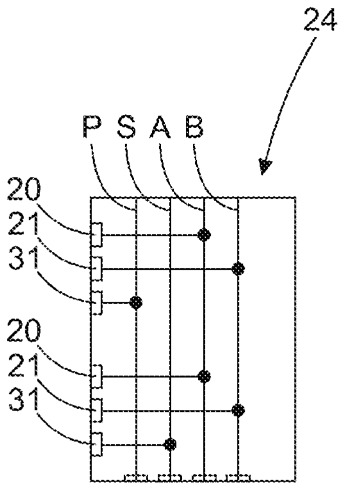

In the first variant of a channel plate 24 according to FIG. 5, a supply connection 31 is connected to the first connecting channel 43, a second supply connection 31 is connected to the second connecting channel 44, the first two valve connections 20 are connected to the third connecting channel 45 and the second two valve connections 21 are connected to the fourth connecting channel 46. Accordingly, one valve assembly 18 is used as a vent valve for the two connecting channels 45 and 46, while the other valve assembly 18 is used as a pressure supply valve for the two connecting channels 45 and 46.

Figure 6:
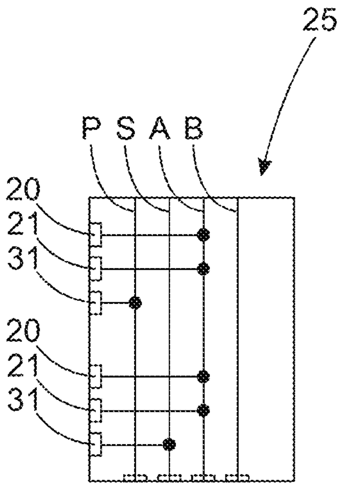

In the second variant of a channel plate 25 according to FIG. 6, a supply connection 31 is connected to the first connecting channel 43 and a second supply connection 31 is connected to the second connecting channel 44. Furthermore, all valve connections 20, 21 are connected to the third connecting channel 45, while the fourth connecting channel 46 has no connection. With such a fluidic circuit in the channel plate 25, a pneumatic actuator can be supplied with air and vented with a double volume flow, for example a single-acting pneumatic cylinder.

Figure 7:
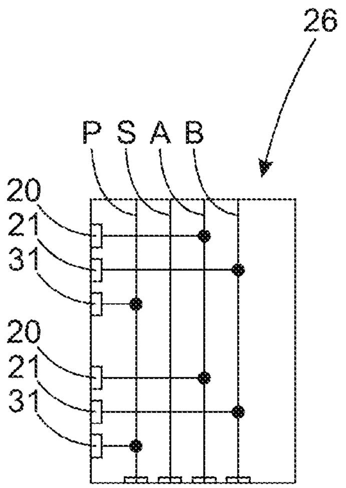

In the third variant of a channel plate 27 according to FIG. 7, both supply ports 31 are connected to the first connecting channel 43, while the respective first valve ports 20 are connected to the third connecting channel 45 and the respective second valve ports 21 are connected to the fourth connecting channel 46. In this way, for example, fluid flow control can be carried out for two separate compressed air consumers, which are fluidically connected to the third connecting channel 45 or to the fourth connecting channel 46.

Figure 8:
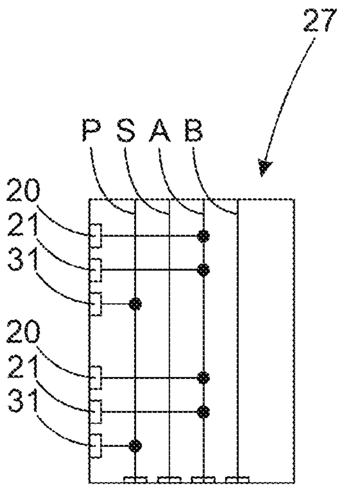

In the fourth variant of a channel plate 27 according to FIG. 8, both supply ports 31 are connected to the first connecting channel 43, while all valve ports 20, 21 are connected to the third connecting channel 45 and have no connection to the fourth connecting channel 46. In this way, for example, fluid flow control can be carried out for a compressed air consumer with a flow cross-section that is twice as large as that of the channel plate 27 according to FIG. 7.

Figure 9:
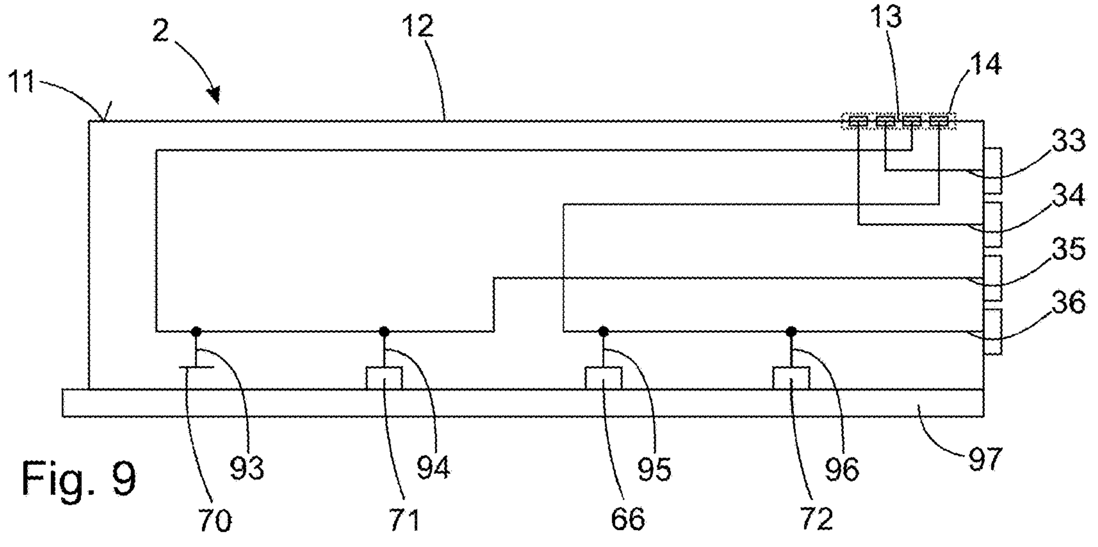

In the case of the equipment variant shown in FIG. 9 for the sensor board 97 arranged below the carrier plate 2, it is provided purely exemplarily that the first stub line 93 is closed with a blind plug 70 and that the second stub line 94 is assigned a temperature sensor 71. The third stub line 95 is assigned a pressure sensor 66 and the fourth stub line 96 is assigned a humidity sensor 72.

Figure 10:
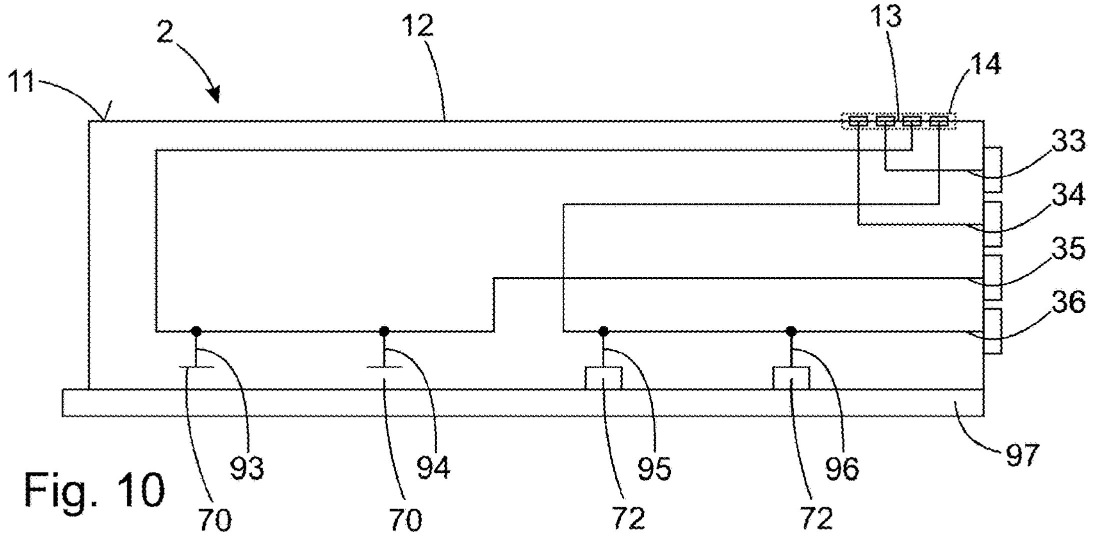

In the case of the assembly variant shown in FIG. 10 for the sensor board 97 arranged below the carrier plate 2, it is envisaged purely by way of example that both the first stub line 93 and the second stub line 94 are closed with blind plugs 70 and that a temperature sensor 71 is associated with the third stub line 95 and a humidity sensor 72 is associated with the fourth stub line 96.

It is understood that different sensors can be assigned to each of the stub lines 93 to 96 as required, these being assembly variants for the sensor board 97, while no other changes, in particular to the carrier plate 2, are required.

The invention claimed is:

1. A valve module system for supplying compressed air to a compressed-air consumer, comprising:

a carrier plate with an interface surface which is provided with at least one interface having a connection area which is provided with a plurality of channel openings for the attachment of a valve module, wherein each channel opening being connected to a fluid channel formed in the carrier plate, further comprising at least one valve module having a valve housing which rests with a interface surface at least partially on the respective interface and which has a plurality of shafts, which shafts are aligned parallel to one another and whose shaft openings are arranged on a valve housing end face in a common shaft opening plane which is aligned transversely to the interface surface, further comprising at least one valve assembly which is accommodated in one of the shafts, wherein a first valve connection and a second valve connection being formed on an end face of the valve assembly, which end face is arranged in the region of the shaft opening, and wherein a valve seat and an electrically actuatable valve member, which is movable between a closed position for the valve seat and an open position for the valve seat are arranged in a first control channel associated with the first valve connection and/or are arranged in a second control channel associated with the second valve connection, wherein the valve housing is provided with a channel plate which is connected in a sealing manner to the valve housing end face or to the valve assembly by means of a first coupling surface and which bears in a sealing manner against the connection area by means of a second coupling surface, wherein a plurality of connecting channels being formed in the channel plate for connecting the first valve connection and the second valve connection to a respective channel opening of the at least one interface.

2. The valve module system according to claim 1, wherein the channel plate rests in a sealing manner against the valve housing end face and bounds a pressure space with the shaft in which the valve assembly is accommodated.

3. The valve module system according to claim 1, wherein the valve assembly rests in a sealing manner, by means of a peripheral seal, against an inner surface of the shaft and delimits a pressure space with the shaft, and wherein a supply connection is formed on the end face of the valve assembly which supply connection is connected to the pressure space and to a connecting channel in the channel plate.

4. The valve module system according to claim 1, wherein the carrier plate has a connecting surface which is provided with fluid couplings which are assigned to mouth openings of fluid channels opening out at the coupling surface.

5. The valve module system according to claim 4, wherein the connection area has a first mouth opening of a first fluid channel and a first working coupling is assigned to the first fluid channel, wherein the connection area has a second mouth opening of a second fluid channel and a second working coupling is assigned to the fluid channel, wherein the connection area has a third mouth opening of a third fluid channel and a first fluid coupling is assigned to the third fluid channel, wherein the connection area has a fourth mouth opening of a fourth fluid channel and a second fluid coupling is assigned to the fourth fluid channel.

6. The valve module system according to claim 1, wherein a seal is arranged between the second coupling surface of the channel plate and the connection area for individual sealing between the shaft openings and the respectively associated connecting channels.

7. The valve module system according to claim 1, wherein the channel plate provides for each valve assembly received in the valve housing an individual fluidic connection of the first valve connection, the second valve connection and the supply connection to a respectively associated connecting channel.

8. The valve module system according to claim 1, wherein a valve seat and an electrically actuatable valve member which can be moved between a closing position for the valve seat and an opening position for the valve seat are arranged in the first control channel and wherein a valve seat and an electrically actuatable valve member that can be moved between a closed position for the valve seat and an open position for the valve seat are arranged in the second control channel.

9. The valve module system according to claim 8, wherein the channel plate has a first connecting channel which is connected to a first valve connection of a first valve assembly and to a first valve connection of a second valve assembly, and has a second connecting channel which is connected to a second valve connection of the first valve assembly, and to a second valve connection of the second valve assembly and has a third connecting channel which is connected to the supply connection of the first valve assembly, and has a fourth connecting channel which is connected to the supply connection of the second valve assembly.

10. The valve module system according to claim 8, wherein a first valve assembly and a second valve assembly are located in the valve housing and wherein the channel plate has a first connecting channel which is connected to a first valve connection and a second valve connection of the first valve assembly and to a first valve connection and a second valve connection of the second valve assembly, and has a second connecting channel, which is connected to a supply connection of the first valve assembly, and has a third connecting channel, which is connected to a supply connection of the second valve assembly.

11. The valve module system according to claim 8, wherein a first valve assembly and a second valve assembly are located in the valve housing and wherein the channel plate has a first connecting channel which is connected to a first valve connection of the first valve assembly and to a first valve connection of the second valve assembly, and has a second connecting channel which is connected to a second valve connection of the first valve assembly and to a second valve connection of the second valve assembly, and has a third connecting channel which is connected to a supply connection of the first valve assembly and to a supply connection of the second valve assembly.

12. The valve module system according to claim 8, wherein a first valve assembly and a second valve assembly are located in the valve housing and wherein the channel plate has a first connecting channel which is connected to a first valve connection and a second valve connection of the first valve assembly and to a first valve connection and a second valve connection of the second valve assembly, and has a second connecting channel which is connected to a supply connection of the first valve assembly and to a supply connection of the second valve assembly.

13. The valve module system according to claim 1, wherein the valve member is connected to a piezoelectric drive and wherein the piezoelectric drive is coupled to a voltage supply which is electrically connected to a controller, wherein the controller provides drive signals for driving the piezoelectric drive to the voltage supply.

14. The valve module system according to claim 13, wherein a sensor from the group: pressure sensor, temperature sensor, flow sensor, humidity sensor, is electrically connected to the controller and provides an electrical sensor signal to the controller.

15. The valve module system according to claim 14, wherein the sensor is connected to a sensor channel which branches off from the fluid channel.

16. The valve module system according to claim 13, wherein a fluid channel formed in the carrier plate has a throttle section and wherein a first pressure sensor is assigned to a first end region of the throttle section and provides a first pressure-dependent electrical sensor signal and wherein a second pressure sensor is assigned to a second end region of the throttle section and provides a second pressure-dependent electrical sensor signal, and wherein the first pressure sensor and the second pressure sensor are electrically connected to the controller.

* * * * *